United States Patent [19]

Fryer

[11] Patent Number: 4,688,215
[45] Date of Patent: Aug. 18, 1987

[54] DEMULTIPLEXER FOR TWO-STAGE FRAMING

[75] Inventor: Warren R. Fryer, New York, N.Y.

[73] Assignee: Calculagraph Company, Hanover, N.J.

[21] Appl. No.: 741,740

[22] Filed: Jun. 5, 1985

[51] Int. Cl.[4] .......................... H04J 3/06; H04L 7/00
[52] U.S. Cl. ................................. 370/102; 370/106;
                                                     370/100; 375/112
[58] Field of Search ................ 370/106, 102, 112, 60,
                                                     370/84, 100; 375/112

[56] References Cited

U.S. PATENT DOCUMENTS

| | | |
|---|---|---|
| 3,597,539 | 8/1971 | Clark . |
| 3,621,140 | 11/1971 | Griffiths . |
| 3,833,729 | 5/1974 | Augier de Cremiers . |
| 3,842,399 | 10/1974 | Kneuer et al. . |
| 3,854,011 | 12/1974 | Mallory et al. . |
| 3,903,371 | 9/1975 | Colton et al. ................. 179/15 BS |
| 4,003,845 | 1/1977 | Kaul et al. . |
| 4,032,885 | 6/1977 | Roth . |
| 4,203,003 | 5/1980 | Kline ............................. 375/112 |
| 4,213,011 | 7/1980 | Hoelzl et al. .................. 370/106 |
| 4,247,945 | 1/1981 | Seibel . |
| 4,298,987 | 11/1981 | Stattel et al. . |
| 4,347,606 | 8/1982 | Hoogeveen .................... 370/105 |
| 4,375,102 | 2/1983 | Van Daal . |
| 4,397,017 | 8/1983 | Rokugo .......................... 370/102 |
| 4,450,558 | 5/1984 | Hampton et al. ............... 370/106 |
| 4,596,026 | 6/1986 | Cease et al. .................... 370/102 |

Primary Examiner—Douglas W. Olms
Assistant Examiner—Curtis Kuntz
Attorney, Agent, or Firm—Stanger, Michaelson and Einschlag

[57] ABSTRACT

An apparatus is disclosed for demultiplexing digital signals which utilize two framing sequences, such as the DS1C and DS2 signals of Digital Telephony, to provide framing and pulse stuffing synchronization control information.

16 Claims, 4 Drawing Figures

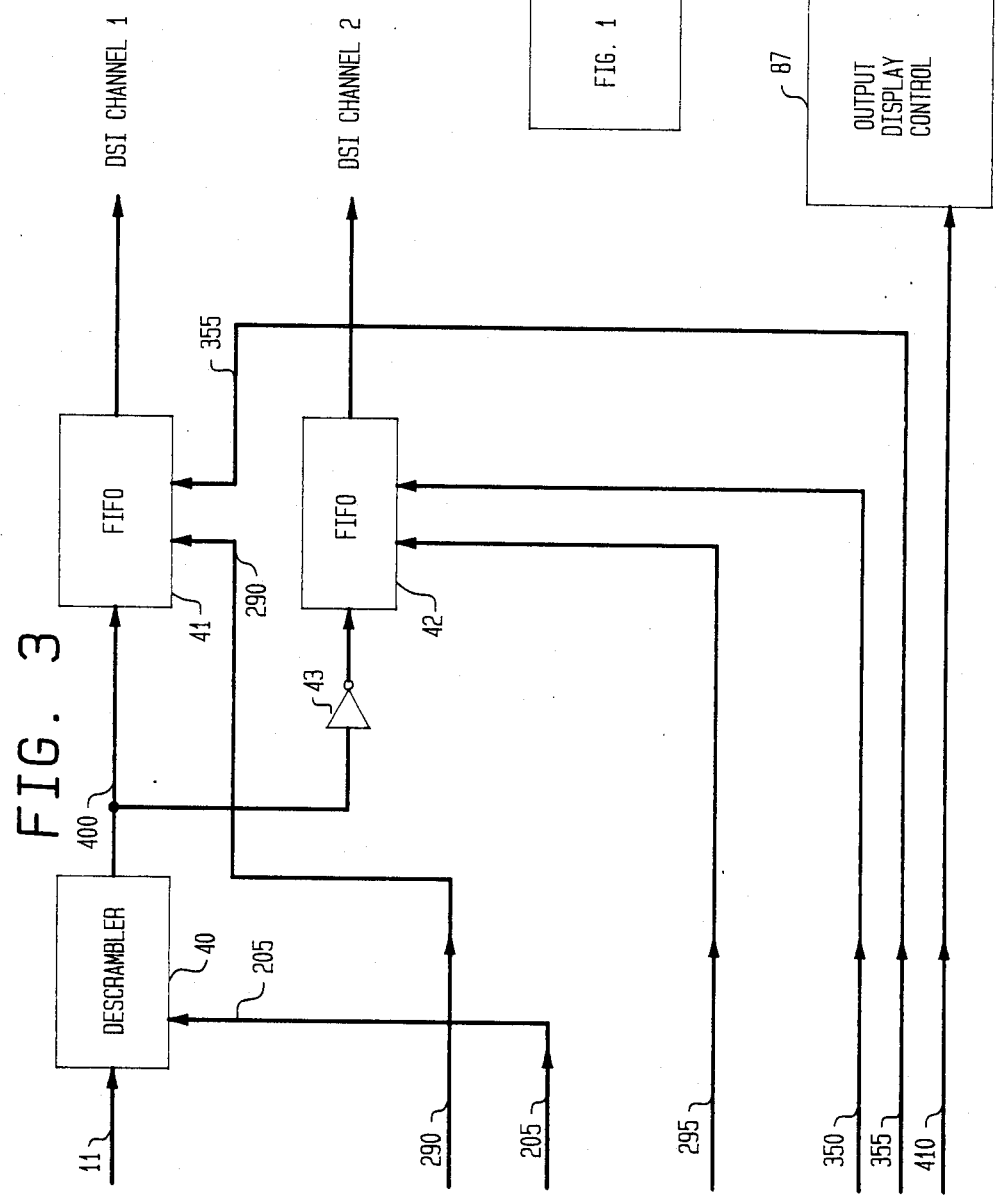

DEMULTIPLEXER FOR TWO-STAGE FRAMING

BACKGROUND OF THE INVENTION

The present invention pertains to the field of digital communication and in particular to demultiplexers for digital signals having two framing sequences.

In digital communications, a signal typically comprises a stream of bits which are all the same. In order to be able to extract information from this digital signal, a transmitter multiplexer inserts identification information into the digital bit stream to provide a frame of reference for a receiver demultiplexer to appropriately group the information bits. This identification information is usually a pre-determined bit sequence which defines a frame. An economical bit sequence is a recurring pattern of a single bit which has an on-off statistic that is highly improbable for any other time slot within the frame. In particular, bits in this pattern recur at regular intervals of "I" bits, where I is the interval from the start of one frame to the start of the next. Such framing is used for the DS1 signal of Digital Telephony where $I=193$. A further example is the Extended Framing Format of the DS1 signal which has $I=772$.

Because the bits of a digital signal are all the same, no information can be extracted from a digital signal if framing is not detected. Thus, when framing is lost, communications are lost until framing is re-established. Therefore, a receiver must be sensitive to and recognize the pre-determined framing pattern quickly. Furthermore, framing should be detected with minimal hardware in order to advantageously lower the cost of the entire digital transmission system.

In addition to framing, a further concern of digital system designers is to properly synchronize digital signals emanating from different sources. The bit rate of each such digital signal is established by a sampling clock situated at each terminal equipment. Unfortunately, these sampling clocks are not synchronized. Nevertheless, synchronization can be established by assigning a small fraction of the digital bit stream to the housekeeping function of synchronization. This approach readily allows adding and dropping of digital signals along the transmission route and does not require distribution or derivation of a master clock, or build out of transmission delays.

One technique for using a small portion of the transmitted bit stream capacity for achieving synchronization is known as pulse stuffing. In this technique, the various sampling clocks are allowed to run asynchronously. However, the transmitter multiplexer output rate is set to exceed the maximum possible incoming information rate, i.e. there are a few more bits per second available at the output than can be utilized by the incoming signals. The extra time slots are stuffed with dummy information, and the locations of the stuffed pulses are identified by a synchronization control signal to allow the receiver to delete the stuffed pulses. The receiver removes the stuffed pulses and closes the associated time gaps to deliver a bit stream which is frequency locked and otherwise essentially identical to the input bit stream.

In some instances, the synchronization control signal, also known as stuff indicator bits, can be located by incorporating two framing sequences into a digital signal, each framing sequence comprising a recurring pattern of a single bit. The stuff indicator bits, which indicate the presence or absence of stuffed pulses, are offset at specified positions from the bits of the framing sequences.

Both the DS1C and the DS2 digital signal formats used in Digital Telephony utilize two framing sequences in the manner described hereinabove. The bits of the first framing sequence recur every I bits in the digital signal and the bits of the second framing sequence recur every $N \times I$ bits, where N is an integer. The bits of the second framing sequence are displaced from the bits of the first framing sequence by D bits and occur $1/N$ as often in the digital signal as do the bits of the first framing sequence. The second framing sequence is used to locate the stuff indicator bits. For the DS1C digital signal, $D=53$, $I=159$ and $N=2$; and for the DS2 digital signal, $D=49$, $I=147$ and $N=2$.

Tables I and II illustrate the DS1C and DS2 signal formats, respectively. Control bits labelled "F" are framing bits for the first sequence. Control bits labelled "M" and "C" appear between the "F" bits. The "M" bits are framing bits for the second framing sequence and the "C" bits form the three bit code which denotes the presence or absence of a single stuffed pulse. Redundant coding is used to protect the stuff indicator signal against errors. Three to one redundancy with majority vote at the receiver protects against single errors. The brackets with number contained therein indicate the location of the information bits, the numbers within the brackets indicating the number of information bits. In Tables I and II, the subscripts of the "M" and "F" bits identify the bit as a "0" or a "1".

TABLE I

| DS1C (3.152 Mb/s) Digital Signal Format | | | | | | | | | | | |
|---|---|---|---|---|---|---|---|---|---|---|---|
| $M_0$ | [52] | $C_1$ | [52] | $F_0$ | [52] | $C_1$ | [52] | $C_1$ | [52] | $F_1$ | [52] |
| $M_1$ | [52] | $C_2$ | [52] | $F_0$ | [52] | $C_2$ | [52] | $C_2$ | [52] | $F_1$ | [52] |
| $M_1$ | [52] | $C_1$ | [52] | $F_0$ | [52] | $C_1$ | [52] | $C_1$ | [52] | $F_1$ | [52] |
| $M_x$ | [52] | $C_2$ | [52] | $F_0$ | [52] | $C_2$ | [52] | $C_2$ | [52] | $F_1$ | [52] |

Table I illustrates the format of the DS1C signal. The DS1C signal is formed as follows: two DS1 Digital Telephony standard 1.544 Mb/s signals are input to a transmitter multiplexer as bipolar signals; each DS1 signal is converted to the unipolar signal format; the second DS1 signal is logically inverted, i.e. all "0"s are converted to "1"s and all "1"s are converted to "0"s, to control the signal statistics of the DS1C signal; each DS1 signal is stuffed; the DS1 signals are multiplexed by interleaving them bit-by-bit; the interleaved bit stream is scrambled according to a scramble algorithm where each scrambler output bit is the modulo two sum of the corresponding input bit and the preceding output bit; the scrambled signal is combined with the "F", "M", and "C" control bits; and, finally, the resultant signal is converted to a bipolar format having a 50-percent duty cycle for transmission.

Each control bit precedes a block of 52 bits from the multiplexed DS1 signals, 26 bits from each, indicated by [52] in Table I. The control bits form a 24-bit long repetitive sequence, which, with the 52 information bits associated with each control bit, defines a 1272-bit block called an "M" frame. This 24-bit control bit sequence may be regarded as a digital word, the individual bits of which are dispersed in the composite signal bit stream. The sequence of "M" bits, i.e. the second framing sequence, consists of four bits designated $M_0$, $M_1$, $M_1$, and $M_x$. They are the first, seventh, thirteenth, and ninteenth bits in the 24-bit sequence of control bits and define the start of four 318-bit subframes in the 1272-bit "M" frame. The first three of the "M" bits, "0 1 1", are used to identify the "M" frame and the fourth bit, x, is used for maintenance signaling. A "1" indicates no alarm and a "0" indicates the presence of an alarm.

The "F" bit sequence, i.e. the first framing sequence, is made up of alternate "1"s and "0"s that appear at the beginning of every third 52-bit information sequence, i.e., as every third bit in the 24-bit control bit sequence.

There is a sequence of three "C" bits in each subframe, three "1"s for the presence of a stuff bit and three "0"s for nostuff. The locations of the "C" bits is established from the $M_0M_1M_1M_x$ second framing sequence. The stuffed bit is the fifth information bit following the third "C" bit in a subframe for the first DS1 signal and the sixth information bit following the third "C" bit in a subframe for the second DS1 signal. In Table I, $C_1$ denotes stuffing indicator bits for the first DS1 signal and $C_2$ denotes stuffing indicator bits for the second DS1 signal.

| DS2 (6.312 Mb/s) Digital Signal Format | | | | | | | | | |
|---|---|---|---|---|---|---|---|---|---|
| $M_0$ | [48] | $C_1$ | [48] | $F_0$ | [48] | $C_1$ | [48] | $C_1$ | [48] | $F_1$ | [48] |
| $M_1$ | [48] | $C_2$ | [48] | $F_0$ | [48] | $C_2$ | [48] | $C_2$ | [48] | $F_1$ | [48] |
| $M_1$ | [48] | $C_3$ | [48] | $F_0$ | [48] | $C_3$ | [48] | $C_3$ | [48] | $F_1$ | [48] |
| $M_x$ | [48] | $C_4$ | [48] | $F_0$ | [48] | $C_4$ | [48] | $C_4$ | [48] | $F_1$ | [48] |

Table II illustrates the format of the DS2 signal. The DS2 signal is made up of a combination of four DS1 signals. A 24-bit control bit sequence, along with 48 information bits associated with each control bit, defines an 1176-bit "M" frame which is divided into four 294-bit subframes. The "M" and "F" bit sequences are the same as described hereinabove for the DS1C signal. Each control bit is followed by a 48-bit block of information of which 12 bits are taken from each of the four DS1 signals. They are interleaved sequentially in the 48-bit block. The stuff indicator bits, i.e. "C" bits, use the same code as described hereinabove for the DS1C signal and are transmitted at the beginning of the 2nd, 4th, and 5th 48-bit information blocks within each subframe. The stuff bit positions are all assigned to the sixth 48-bit information block in each subframe. In subframe No. 1, the stuff bit is the first bit after the F1 bit; in subframe No. 2, the stuff bit is the second bit after the F1 bit, and so on through the fourth subframe. In Table II, $C_1$ denotes stuffing indicator bits for the first DS1 signal, $C_2$ denotes stuffing indicator bits for the second DS1 signal, and so forth.

Prior to multiplexing, input DS1 signals 2 and 4 are logically inverted to improve the properties of the output DS2 signal. At the output of the multiplexer, the signal is converted to a bipolar format having a 50-percent duty cycle. The format used is called "bipolar with six-zero substitution."

SUMMARY OF THE INVENTION

Embodiments of the present invention advantageously demultiplex digital signals of the sort discussed hereinabove by means of a novel two-stage search.

A first stage search for a pre-determined pattern of "F" bits is made to determine the location of the "F" framing bits in the digital signal. After the location of the "F" bits is determined, a second stage search for a pre-determined pattern of "M" bits is made, at a location which is offset by a fixed amount from the location of the "F" bits, to determine the location of the first bit of the "M" frame.

After the location of the first bit of the "M" frame is determined, the demultiplexer is "declared in-frame". Thereafter, all 24 control bits are continually monitored. The pattern established by control bits designated $M_0$, $M_1$, $F_0$, and $F_1$ in Tables I and II is expected, and the remaining control bit positions are "don't cares." When two out of four control bits do not conform with the expected values, the demultiplexer declares an "out-of-frame" and starts the first framing sequence search for "F" bits again.

Embodiments of the present invention utilize a memory storage device having "I" memory storage locations in the search for the first framing sequence, where I is the number of bits in the digital signal from the start of one "F" bit to the start of the next. Several bits can be stored at each memory storage location of the memory storage device.

Each bit in the incoming digital signal is shifted into the least significant bit position of a memory storage location. Sequentially arriving bits are stored in sequential memory storage locations. After storing a bit in the Ith memory storage location, the next bit is stored in the first memory storage location. Thus, when the most significant bit at a memory storage location represents a bit from the incoming digital signal, the second most significant bit at that memory storage location represents a bit from the incoming digital signal that entered the demultiplexer I bits after the first bit, and the third most significant bit at that memory storage location represents a bit from the incoming digital signal that entered the demultiplexer $2 \times I$ bits after the first bit, and so forth. Since "F" bits enter the demultiplexer at intervals of I bits, a search of the I memory storage locations reveals one memory storage location which has a pattern of bits corresponding to the pre-determined "F" frame sequence. For example, when the predetermined "F" frame sequence is alternating "1"s and "0"s and each memory storage location in the memory storage device stores 8 bits, the "01010101" pattern of bits at a memory storage location, i.e. 55 in hexadecimal, represents the "F" frame sequence. Thus, embodiments of the present invention include apparatus for searching the memory storage locations of the memory storage device for the "F" frame sequence, e.g. 55 hexadecimal, to determine the location of the "F" bits in the digital signal and thereby to complete the first stage of the search.

The second stage search is performed by examining the contents of the memory storage location which is D locations from the memory storage location of the "F" bits for a pre-determined sequence of "M" bits. Because of the fact that successive bits in a memory storage location represent bits in the incoming digital signal that are separated by I bits and the fact that "M" bits enter the demultiplexer at intervals of $N \times I$ bits, the memory storage location of the "M" bits includes bits that are not part of the "M" bit sequence. These bits, which are not part of the "M" bit sequence, have to be ignored during the second stage search. Thus, for example, where N=2 and the "M" bit sequence is 011x, the memory storage location of the "M" bit, at the point in time when the first bit of the "M" frame has arrived at the multiplexer, is x1x1xxx0 where x is any bit not relevant to determining the "M" bit pattern.

When the demultiplexer finds the "M" bit sequence code, the second stage of the search is complete and the demultiplexer is "declared in-frame".

Embodiments of the present invention also minimize jitter in the output demultiplexed digital signals. Jitter is introduced into the demultiplexed output when the control bits and the stuff bits are removed from the input digital signal. The inventive demultiplexer generates clock signals for the output by incrementing a counter at a higher rate than the clock rate of the incoming signal and removing clock pulses from the input signal at pre-selected values of the counter. Certain values of the counter always cause a clock pulse to be removed in order to account for removal of control bits from the incoming digital signal, while other values of the counter cause a clock pulse to be removed in order to account for removal of stuff bits from the incoming digital signal.

BRIEF DESCRIPTION OF THE DRAWING

A complete understanding of the present invention may be gained by considering the following detailed description in conjunction with the accompanying drawing, in which:

FIGS. 1-3 show, in pictorial form, a block diagram of a demultiplexer, for use in demultiplexing DS1C signals, which is fabricated in accordance with the present invention; and FIG. 4 shows the manner in which FIGS. 1-3 should be arranged in order to depict the demultiplexer.

To facilitate reader understanding, identical reference numerals are used to designate elements common to the figures.

DETAILED DESCRIPTION

Figure 1:
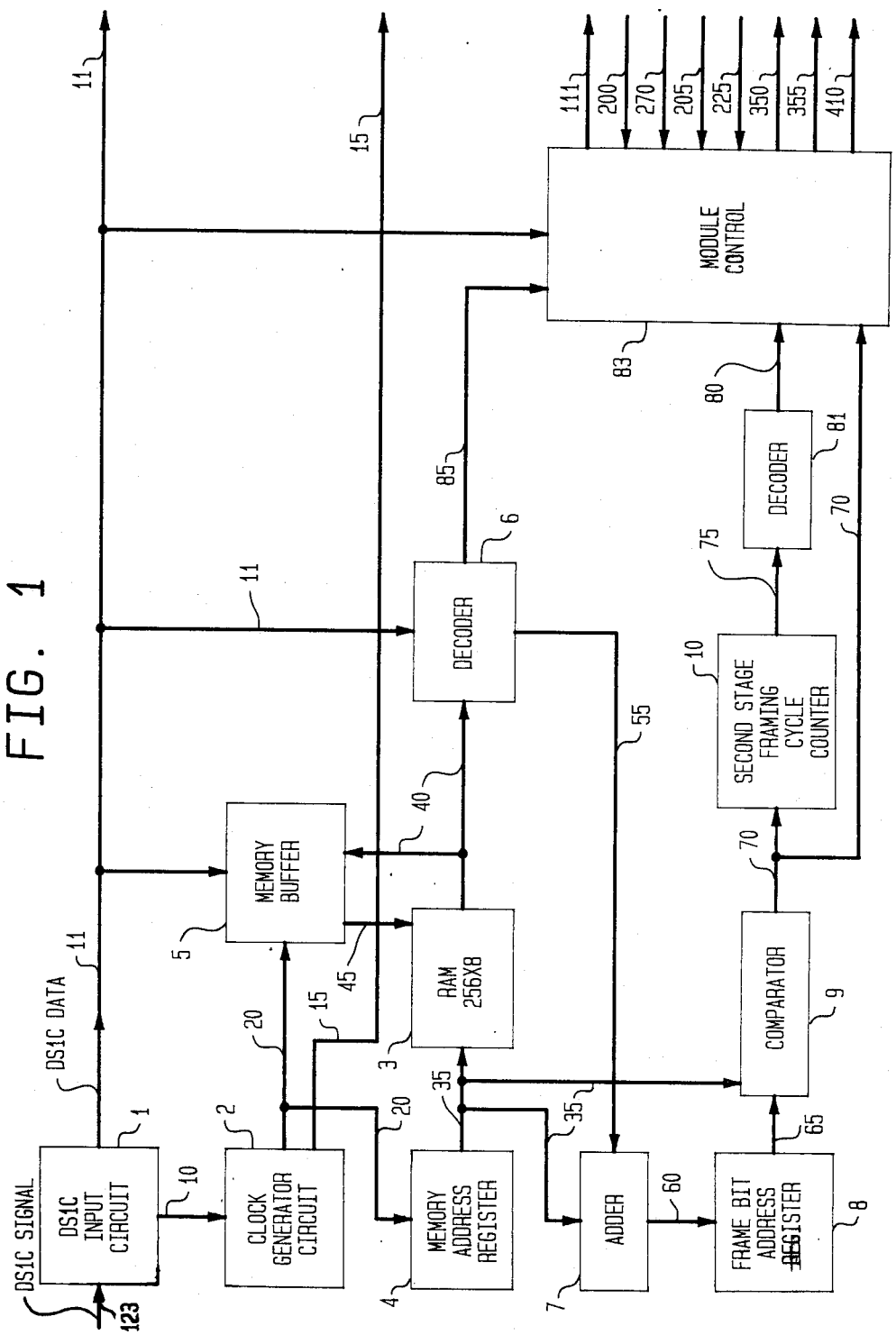
Figure 2:
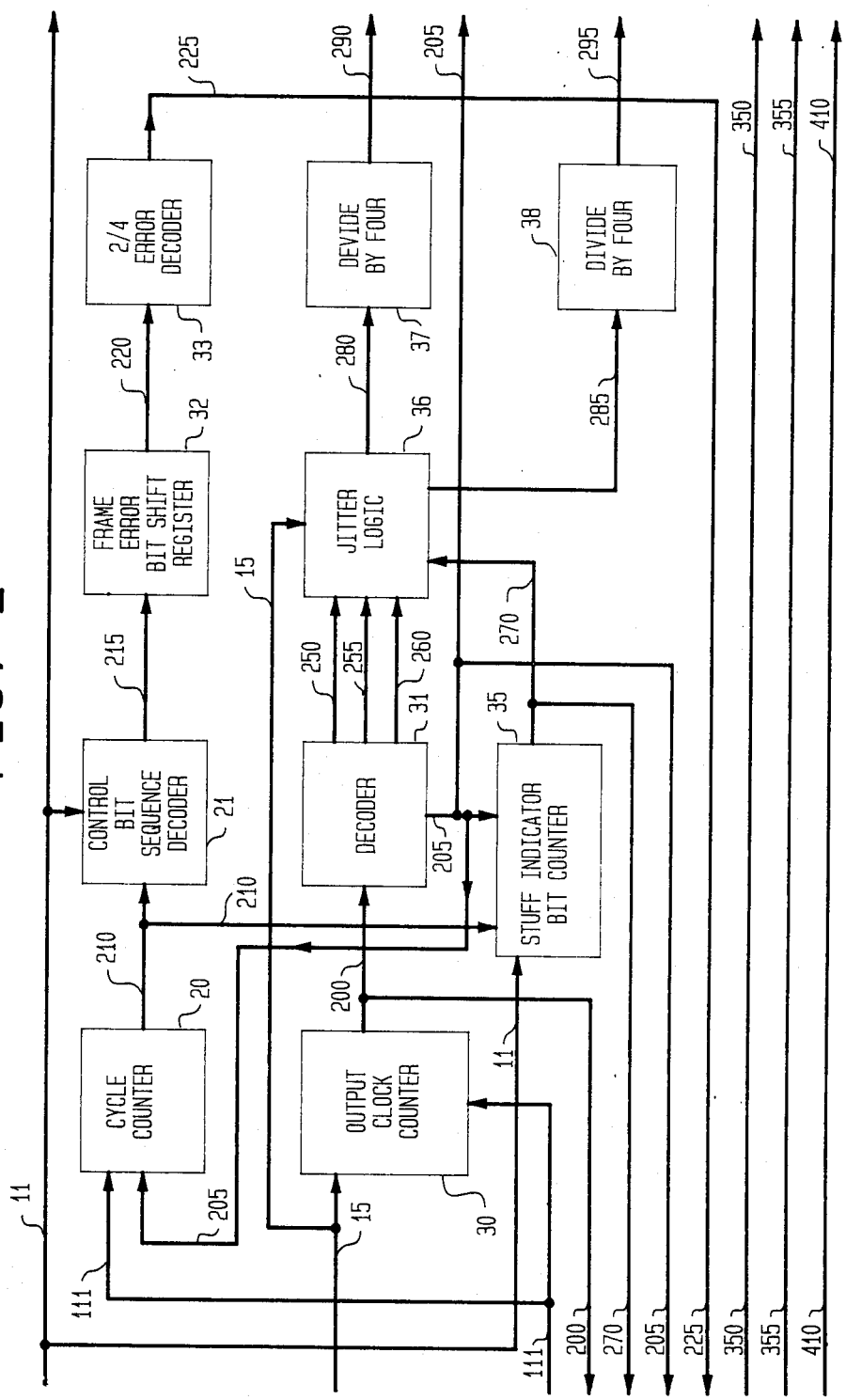

FIGS. 1-3 show a block diagram of a demultiplexer for use in demultiplexing DS1C signals which is fabricated in accordance with the present invention. FIG. 4 shows how FIGS. 1-3 are to be arranged in order to depict the demultiplexer.

DS1C signal 123 is applied to DS1C Input Circuit 1. DS1C Input Circuit 1 extracts the DS1C clock from signal 123 and outputs the clock as signal 10 and the "data" as signal 11. Signal 10 is applied to Clock Generator Circuit 2 which adjusts the phase and symmetry of DS1C clock signal 10. Clock Generator Circuit 2 outputs signal 15, having a clock at twice the DS1C clock rate, and signal 20 having a clock at the DS1C clock rate.

First Stage Framing

Signal 20, at the DS1C clock rate, is applied to Memory Address Register 4. In response to pulses from signal 20, Memory Address Register 4 cycles, one count per pulse, through the counts 0–158 and back again to zero, i.e. it cycles through 159 counts. Memory address signal 35, output from Memory Address Register 4, is applied to RAM 3, a 256 word by 8 bit Random Access Memory, which stores bits from the DS1C digital bit stream. When a memory storage location in RAM 3 is addressed by memory address signal 35 from Memory Address Register 4, the 7 least significant bits in that addressed memory storage location are applied in parallel, as signal 40, as input to the 7 most significant bits of 8-bit Memory Buffer 5.

Signal 20, at the DS1C clock rate, is applied to Memory Buffer 5. In response thereto, Memory Buffer 5 reads the most recently arrived bit from data signal 11 into its least significant bit position. At this point, Memory Buffer 5 contains the 7 least significant bits from the memory storage location in RAM 3 addressed by memory address signal 35 and the most recent bit from data signal 11. At the same time, the same 7 least significant bits from RAM 3, as signal 40, and the most recent bit from data signal 11, are applied to Decoder 6. Next, the above-described contents of Memory Buffer 5 are applied, as signal 45, to RAM 3. In response to signal 45, the contents of Memory Buffer 5 are stored in RAM 3, at the same memory storage location which was addressed by memory address signal 35 from Memory Address Register 4. In this manner, each word of RAM 3 stores successive bits from successive "F" bit intervals.

Decoder 6 examines the above-described 8 bits of information. If these 8 bits form a hexadecimal 55, the first stage of framing is complete and the first framing sequence has been found at the bit location corresponding to the memory storage location address of Memory Address Register 4. If these 8 bits do not form a hexadecimal 55, the above-described search process is continued until the first framing sequence is found at one of the locations in the 159 bit interval for successive "F" bits.

Second Stage Framing

When the first stage of framing is complete, a search for the second framing sequence is initiated. Signal 35, containing a memory address, and signal 55 from Decoder 6, indicating that the first framing sequence was found at the memory address of signal 35, are applied to Adder 7. Adder 7 adds an offset, D=53, to the memory address provided by signal 35 in order to obtain the memory address in RAM 3 for the second framing sequence search, i.e. the search for the "M" bit frame. Adder 7 adds modulo 159 so that the resultant address falls within the 0–158 range of memory storage locations which are used in RAM 3. Signal 60, generated by Adder 7 and applied to Frame Bit Address Register 8, provides the memory storage location address for the "M" bits. Comparator 9 compares the memory storage location address for the "M" bits, provided by signal 65 from Frame Bit Address Register 8, with the address of the memory storage location in RAM 3, provided by signal 35 from Memory Address Register 4. Signal 70 is generated when the addresses are equal. This indicates that the memory storage location for the "M" bits has been reached as Memory Address Register 4 cycles through the memory storage locations of RAM 3.

During the second stage search, Decoder 6 looks at 8-bits—the 7 least significant bits from the "M" bit memory storage location in RAM 3 and the most recently arrived bit from the digital input—for the x1x1xxx0 code which identifies the first bit in the "M" bit sequence. As described hereinabove, because of the fact that successive bits at a memory storage location occurred at an interval of 159 bits in the incoming DS1C signal and the fact that "M" bits enter the demultiplexer at intervals of 2×159 bits, the "M" bit memory storage location includes bits that are not part of the "M" bit sequence and which have to be ignored during the search, i.e. bits denoted as x. The reason Decoder 6 looks for x1x1xxx0 is explained as follows. The "M" bit sequence, as shown in Table I, is 011x, however, the incoming bits in the DS1C signal are shifted into the next in a memory storage location, i.e. the first to arrive is stored in the most significant bit position when the second bit arrives and so on. Thus, at the point in time when the first bit of the "M" frame, i.e. a "0", arrives at the multiplexer, the 7 most significant bits from RAM 3 in Decoder 6 are xxx1x1x. When these 7 bits are combined with the "0" incoming bit we have the x1x1xxx0 code which Decoder 6 seeks.

When the first bit of the "M" bit sequence is detected, Decoder 6 generates signal 85. Signal 85 is applied to Module Control 83 to "declare" that the demultiplexer is "in-frame".

Signal 70, output from comparator 9, is applied to four bit Second Stage Framing Cycle Counter 10 which counts from 0-15. Second Stage Framing Cycle Counter 10 is incremented by one in response to signal 70 when an incoming bit has arrived at the demultiplexer at the "M" bit location in RAM 3. This occurs once every 159 bits. Since there are two 159 bit intervals between each "M" bit, when the counter has reached the value "15", sixteen 159-bit intervals, i.e. two entire "M" bit frames, have been received by the demultiplexer. Second Stage Framing Cycle Counter 10 generates signal 75 which is applied to Decoder 81. When signal 75 is equal to 15, the second framing sequence has not been found and signal 80 is generated by Decoder 81 and applied to Module Control 83. In response to signal 80, Module Control 83 causes the demultiplexer to revert to a search for the first framing sequence. In this manner, the demultiplexer cycles through the "M" bits of the "M" frame no more than twice. Thus, if the first framing sequence was false, the demultiplexer will revert to a search for the first framing sequence.

Monitoring Framing

When the first and second framing sequences have beer found, framing has been achieved. Thereafter, i.e., during "in-frame" operation, the control bit pattern sequence is monitored. When the "in-frame" condition has been found, Module Control 83 generates signal 111 which is applied, along with signal 15, to Output Clock Counter 30. Output Clock Counter 30 is cleared in response to signal 111 and incremented at twice the rate cf the DS1C clock in response to signal 15 from Clock Generator Circuit 2, i.e., it is incremented twice for each data bit that enters the demultiplexer. Output Clock Counter 30 has 7 bits of storage and counts from 0-105, i.e. 106 values, before being recycled again. The six most significant bits of Output Clock Counter 30 provide a subcycle counter whose 53 states indicate which of the 53 bits—including a control bit and the 52 information bits, as shown in Table I—is currently being received from the incoming DS1C signal. Signal 200, output from Output Clock Counter 30, is applied to Decoder 31. When signal 200 is equal to zero, Decoder 31 generates signal 205 which indicates that a control bit has arrived in data signal 11.

Signal 205, indicating the arrival of a control bit, and signal 111 from Module Control 83, indicating the start of an "M" bit frame, are applied to Cycle Counter 20. Cycle Counter 20 has five bits and keeps track of 24 states. These 24 states are the 24 control bit positions in the DS1C digital signal, as described hereinabove. Cycle Counter 20 is cleared in response to signal 111 at the start of an "M" bit frame and is incremented by one in response to signal 205 upon the arrival of a control bit, i.e., every 53rd bit in data signal 11.

Signal 210 is output from Cycle Counter 20 and is applied, along with data signal 11, to Control Bit Sequence Decoder 21. Control Bit Sequence Decoder 21 checks the control bits in data signal 11 to see if they conform to the expected sequence for a DS-1C digital signal (other bits are ignored here). When an $M_0$, $M_1$, $F_0$, or $F_1$ control bit position does not have the expected value, signal 215, output from Control Bit Sequence Decoder 21, is set to 1. When a control bit position has the expected value, signal 215 is set to 0. Signal 215 is shifted into 4 bit Frame Error Bit Shift Register 32 whenever an $M_0$, $M_1$, $F_0$, or $F_1$ control bit position occurs. Frame Error Bit Shift Register 32 outputs signal 220 to 2/4 Error Decoder 33. When 2/4 Error Decoder 33 detects that 2 out of 4 bits of Frame Error Bit Shift Register 32 are one, a "lost frame" signal 225 is generated and applied to Module Control 83, whereupon the demultiplexer reverts to a search for the first framing sequence.

Decoding Stuff Indicator Bits

The demultiplexer has detected the first bit of the "M" bit frame when the "in-frame" mode described hereinabove begins. At that time, Cycle Counter 20 and Output Clock Counter 30 are set to zero and a search for stuff bits begins. The stuff bits in the DS1C signal are preceded by three control bits that are designated "Stuff Indicator" or "C" bits. As shown in Table I, there are two sets of "c" bits associated with stuff bits in an "M" frame for each DS1 signal. The three stuff indicator bits are all made one by a multiplexer when a bit has been stuffed and zero otherwise. When the demultiplexer detects that two out of three stuff indicator bits are one, it decides that the associated stuff bit position has a stuff, i.e. null, bit. The redundancy in the stuff indicator bits ensures that the proper clock rate will be maintained even in case of a single stuff indicator bit error. Data signal 11, control bit signal 205, and Cycle Counter output signal 210 are applied to two bit Stuff Indicator Bit Counter 35. An "M" bit frame, as can be seen from Table I, has 24 control bits and Stuff Indicator Counter 35 is incremented when a control bit equals 1 and Cycle Counter 20 contains the following values: 1, 3, 4, 7, 9, 10, 13, 15, 16, 19, 21, or 22, which values correspond to "C" bits. However, Stuff Indicator Counter 35 is cleared after each "M" bit, i.e. when Cycle Counter 20 equals 0, 6, 12, or 18. Further, stuff bits for the first DS1 signal appear, if at all, as the 5th information bit after control bits corresponding to Cycle Counter 20 values of 4 or 16. Stuff bits for the second DS1 signal appear, if at all, as the 6th information bit after control bits corresponding to Cycle Counter 20 values of 10 or 22.

Signal 270 is output from Stuff Indicator Bit Counter 35 to indicate when DS1 signal 1 or 2 has been stuffed. Signal 270 is applied to Module Control 83 and to Jitter Logic 36.

Generating Output Clocks

Signal 270, which is output from Stuff Indicator Bit Counter 35, signals 250, 255 and 260, which are output from Decoder 31, and signal 15, which is output from Clock Generator Circuit 2 at twice the DS1C clock rate, are all applied to Jitter Logic 36. Jitter Logic 36 is used, in conjunction with Divide By Four Counters 37 and 38, to generate output clocks for the two DS1 signals. Jitter is induced in the output DS1 signals because they are derived from the incoming DS1C signal with control bits and stuff bits removed. Embodiments of the present invention limit the jitter on either DS1 output signal from that cause to less than 25% of the DS1bit interval. This is done by using a 7-bit counter having 106 states (2×53). This counter is incremented at two (2) times the incoming DS1C signal's clock rate. Thus, each state of this counter lasts for one-half of the DS1C signal bit interval, or less than ¼ of a DS1 signal bit interval. The six most significant bits of the counter cycle through 53 states, each of which states reflects the control-bit-plus-52-information-bit cycle within the DS1C signal bit stream.

As described hereinabove, Output Clock Counter 30 is incremented twice for each bit in this 53 bit cycle, i.e. Output Clock Counter 30 is incremented in response to signal 15, and counts from 0–105. Instead of removing one clock pulse from the DS1C signal to account for the removal of a control bit, the inventive apparatus removes two of the double DS1C clock rate pulses. However, in accordance with the present invention, the double rate pulses are not removed sequentially. The double-rate pulses which are removed occur at widely-spaced times within the 53-bit cycle. This is accomplished by removing the double-rate pulses at widely-spaced values of the 0–105 range of Output Clock Counter 30, which range corresponds to the 53-bit cycle. The widely-spaced values of Output Clock Counter 30 are arbitrary. However, as an example, I have chosen signals 255 and 260 to indicate when Output Clock Counter 30 has values 64 and 96, respectively.

Jitter Logic 36 generates signals 280 and 285, corresponding to DS1 signals 1 and 2, respectively. These signals have pulses at double the DS1C clock rate. However, there are no pulses when Output Clock Counter equals 64 or 96. In addition, to account for the removal of stuff bits, signals 280 and 285 have no pulses for two successive 106-value cycles of Output Clock Counter 30 when a stuff bit is present in DS1signals 1 or 2, respectively, and when Output Clock Counter 30 equals 32.

Signals 280 and 285, corresponding to DS1 signals 1 and 2, respectively, are applied to Divide by Four Counters 37 and 38, respectively. Signals 290 and 295, output from Divide By Four Counters 37 and 38, respectively, provide the output clocks for DS1 signals 1 and 2.

Output From The Demultiplexer

Output from the demultiplexer is generated as follows. Data signal 11 and control bit indicator signal 205 are applied to Descrambler 40. Descrambler 40 produces output signal 400 by reversing the scramble algorithm described hereinabove while ignoring control bits, in response to control bit signal 205. Signal 400, output from Descrambler 40, is applied to first-in-first-out (FIFO) Memory 41 and to FIFO Memory 42 through inverter 43. FIFO memories 41 and 42 have several words of storage, each with 8 bits, and have separate input clocks, signals 355 and 350, respectively, generated in Module Control 83. Input clock signals 355 and 350 do not have pulses at the bit positions corresponding to control bits and stuff bits—input clock signals 355 and 350 are formed in response to: signal 270, which indicates when a stuff bit is present; signal 205, which indicates when a control bit is present; and signal 200, which tracks the position of bits in the incoming DS1C signal and thereby provides information from which the position of a stuff bit is obtained. In this manner, data at such bit positions are not shifted into FIFO memories 41 and 42. In this manner, such bits are removed from the output.

The DS1 signals are output from FIFO memories 41 and 42 in response to clock signals 290 and 295, respectively. The clock rates for the FIFO input and output are the same, however, as described hereinabove, the output clock has been generated to minimize jitter.

Embodiments of the present invention further include apparatus which indicates the status of the demultiplexer. Output Display Control 87, in response to signal 410 from Module Control 83, causes a single-character liquid crystal display to present "C" when DS1C input signal 123 is missing, "F" when frame is being sought, "A" when the alarm bit position in the "M" frame shows the alarm condition and "O" for condition OK, i.e. none of the other conditions exist.

Clearly, many other varied embodiments incorporating the teachings of the present invention may be constructed by those skilled in the art without departing from the spirit and scope of the present invention.

What is claimed is:

1. Apparatus for determining the relative location of framing bits in an incoming digital signal, which framing bits recur at intervals of I bits and form a first recurring predetermined bit sequence, which apparatus comprises:
    means for generating a clock signal in response to the incoming digital signal, the clock signal having pulses corresponding to bits in the incoming digital signal;
    a storage device having I storage locations, each of which locations can store L bits;
    addressing means for addressing consecutive locations in the storage device in response to pulses of the clock signal, the consecutive storage locations wrapping around to the first after the Ith storage location has been reached;
    storing means, responsive to the output of the addressing means, the clock signal and the incoming digital signal, for (a) addressing a location in the storage device, (b) retrieving the bits stored therein, (c) discarding the bit stored therein for the longest period of time, (d) forming a result with the remaining L-1 bits and a bit from the incoming digital signal, and storing th result in the addressed location; and
    examination means for examining the result for equivalence with an L bit code which represents a portion of the pre-determined sequence and for providing a signal when equivalence is found, whereby the storage location at which bits from the pre-determined bit sequence are stored and thereby the relative location of framing bits forming the sequence is determined.

2. The apparatus of claim 1 wherein the storing means is comprises means for:
    (a) addressing a location in the storage device,
    (b) retrieving the bits stored therein,
    (c) discarding a bit stored therein in the most significant bit position,
    shifting the remaining L-1 bits by one bit position to a more significant bit position,
    (e) inserting a bit from the incoming digital signal into the least significant bit position to form a result, and
    (f) storing the result in the addressed location.

3. The apparatus of claim 2 which further comprises means for storing the address of the storage location at which bits from the predetermined bit sequence are stored.

4. The apparatus of claim 3 wherein the storage device comprises a random access memory.

5. The apparatus of claim 4 for use with an incoming digital signal having a pre-determined bit sequence of alternating "0"s and "1"s, wherein:
   each storage location in the random access memory can store 8 bits; and
   the L bit code is hexadecimal 55.

6. The apparatus of claim 1 for determining the relative location of framing bits in an incoming signal, which framing bits have a first and a second recurring pre-determined bit sequence, the bits of the second sequence are offset from the bits of the first sequence and recur at intervals of N×I bits, where N is an integer, which apparatus further comprises:
   adder means, responsive to the examination means and the addressing means, for adding an offset, modulo I, to the address of the storage location containing bits from the first pre-determined bit sequence to provide the address of an offset storage location;
   spotter means, responsive to the addressing means and the offset address, for providing a signal to the examination means when the outputs are equal; and
   the examination means further comprises means for examining some of the bits of the result for equivalence with a second code which represents a portion of the second predetermined sequence and for providing an in-frame signal when equivalence is found, whereby the storage location at which bits from the second pre-determined bit sequence are stored and thereby the relative location of framing bits forming the second pre-determined bit sequence is determined.

7. The apparatus of claim 6 wherein the storing means comprises means for:
   (a) addressing a location in the storage device,
   (b) retrieving the bits stored therein,
   (c) discarding a bit stored therein in the most significant bit position,
   (d) shifting the remaining L-1 bits by one bit position to a more significant bit position,
   (e) inserting a bit from the incoming digital signal into the least significant bit position to form a result, and
   (f) storing the result in the addressed location.

8. The apparatus of claim 6 for use with the incoming digital signal further having control bits recurring every R bits, where R<I, some of which control bits are bits from the first predetermined sequence and some of which control bits are bits from the second pre-determined sequence, which apparatus further comprises:
   means, responsive to the incoming digital signal and the in-frame signal, for detecting and counting incoming bits in relative locations which correspond to the relative locations of control bits and for providing a control bit signal when a control bit is detected; and
   means, responsive to the incoming digital signal and the control bit signal, for comparing incoming bits in the relative locations of control bits for equivalence wiht a pre-determined sequence of control bits and for producing a signal when a bit in the relative location of a control bit does not have the value expected from the pre-determined sequence of control bits.

9. The apparatus of claim 8 for use with the incoming digital signal further having control bit intervals recurring every R bits, where R<I, the first bit of the control bit interval being a control bit which is followed by R−1 information bits from several signals, some of which control bits are stuff indicator bits which indicate the presence of stuff bits in the R−1 information bits, which apparatus further comprises:
   stuff locator means, responsive to the incoming digital signal and the control bit signal, for detecting and decoding incoming bits in relative locations which correspond to the relative locations of stuff indicator control bits; and
   means, responsive to the sutff locator means, for determining the presence of stuff bits in the information bits and providing a stuff indicator signal for each of the several signals.

10. The apparatus of claim 9 further comprising:
    means, responsive to the incoming digital signal and the stuff indicator signals, for providing a stuff pulse signal for each of the several signals when a bit in the incoming digital signal is a stuff bit.

11. The apparatus claimed in accordance with claim 10 which further comprises means for generating output clocks for the several signals.

12. The apparatus claimed in accordance with claim 11 wherein the means for generating output clocks comprises:
    means responsive to the incoming digital signal, for generating pulses at a higher clock rate than the clock rate of the incoming digital signal,
    counter means responsive to the pulses, for counting the higher clock rate pulses occuring in a control bit interval,
    deleting means responsive to the higher clock rate pulses and output from the counter means, for deleting pulses from the higher clock rate pulses at various values of the count of the counter means to provide the output clocks.

13. The apparatus claimed in accordance with claim 12 wherein the means for generating output clocks further comprises divider means of reducing the clock rate of the output from the deleting means to provide output signal clocks for the several signals.

14. The apparatus claimed in accordance with claim 13 which further comprises FIFO memory means for each output signal, each of which FIFO memory means output data in response to an output signal clock.

15. The apparatus claimed in accordance with claim 14 for a DS1C digital signal wherein the divider means are divided by four circuits.

16. An apparatus for demultiplexing an incoming digital signal which has an input clock rate, control bit intervals recurring every R bits, the first bit of the control bit interval being a control bit which is followed by R-1 information bits from several signals, some of which control bits are stuff indicator bits which indicate the presence of stuff bits in the R−1 information bits, which apparatus comprises:
    means responsive to the incoming digital signal, for generating pulses at a higher clock rate tha the input clock rate,
    counter means, responsive to the pulses, for counting the higher clock rate pulses occurring in a control bit interval,
    means, responsive to the incoming digital signal, for decoding the stuff indicators to identify stuff bits in the subsequent information bits,
    means, responsive to the higher clock rate pulses, output from the stuff identifier means, and output from the counter means, for deleting pulses from the higher clock rate pulses at various values of the count of the counter means to provide the output clocks.

* * * * *